United States Patent [19]

Bernreiter et al.

[11] 4,064,047

[45] Dec. 20, 1977

[54] METHOD AND APPARATUS FOR WASTE WATER TREATMENT

[76] Inventors: George Bernreiter, 560, 38th Avenue, Lachine, Quebec; Leslie Truxa, 4881 Westhill, N.D.G., Montreal, Quebec, both of Canada

[21] Appl. No.: 706,922

[22] Filed: July 19, 1976

[30] Foreign Application Priority Data

July 24, 1975 Canada .................................... 232187

[51] Int. Cl.[2] ............................ C02C 1/40; C02B 3/08
[52] U.S. Cl. .................................. 210/96 R; 210/632; 210/205; 210/243
[58] Field of Search ................. 210/96, 192, 198, 205, 210/206, 632, 243; 55/227, 229

[56] References Cited

U.S. PATENT DOCUMENTS

| | | | |
|---|---|---|---|
| 662,509 | 11/1900 | Broek | 210/198 R |
| 1,044,653 | 11/1912 | Held | 210/192 |
| 1,124,601 | 1/1915 | Franklin | 210/192 |
| 2,089,793 | 8/1937 | Hartman | 210/192 X |
| 3,262,878 | 7/1966 | Beckley et al. | 210/96 X |
| 3,664,951 | 5/1972 | Armstrong | 210/96 X |
| 3,960,523 | 6/1976 | Ryan | 55/227 X |

*Primary Examiner*—John Adee

[57] ABSTRACT

A method of and apparatus for waste water treatment use a closed ozone absorption chamber to absorb ozone, supplied to the chamber under pressure, with waste water sprayed against an inner surface of the chamber, the waste water being electrically charged prior to its discharge in the chamber.

12 Claims, 7 Drawing Figures

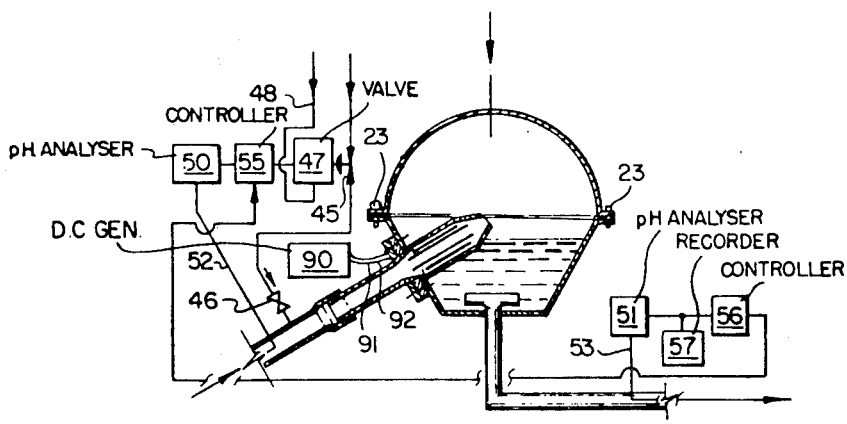
FIG. 3
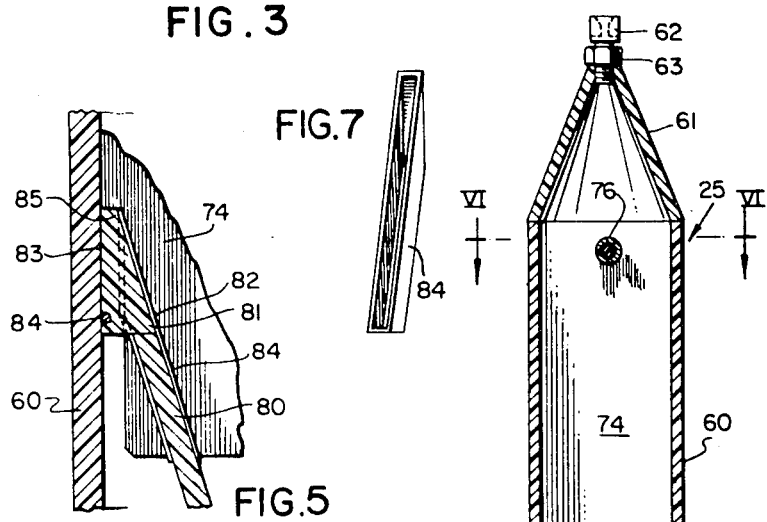
FIG. 7
FIG. 5
FIG. 4
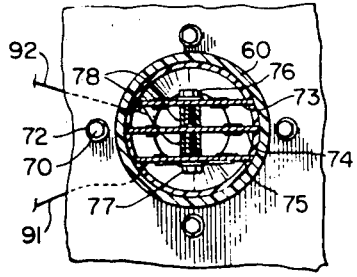
FIG. 6

METHOD AND APPARATUS FOR WASTE WATER TREATMENT

The present invention relates to waste water treatment apparatus, more particularly to apparatus for effecting absorption of ozone in waste water, and to methods of effecting such treatment.

In the past, various methods have been employed for the purpose of purifying waste water. For example, coagulation of waste in waste water has been effected by the use of inorganic coagulants, such as aluminum sulphate, sodium aluminate, ferric and ferrous sulphate and various organic polyelectrolytes. Coagulant aids such as non-ionic organic polymers, betonic clays and activated silica have been employed. The apparatuses employed with these chemicals have included clarifiers, reactors and accelerators, with various mixing devices. In one prior art method, waste water was intimately mixed with ozone at the throat of a waste water injector. Other prior art methods have employed porous stones or diffusers, stirrers, discs and the like for effecting the mixing of the ozone with the waste water.

In general, these prior art methods suffered from the disadvantage that they require mixing chambers of large volume, and consequently of undesirably high dimensions, for example, of the order of 7 to 18 feet high.

Also, these prior methods have employed electrocoagulators in which the waste water was passed over electrodes, of aluminum, platinum or other metal, to which a d.c. current was applied. These prior art electrocoagulators required relatively large electrodes, as compared with the amount of waste water treated, and were consequently expensive to manufacture and consumed undesirably large amounts of electricity, and were therefore expensive to operate.

It is an object of the present invention to provide an improved apparatus for, and method of, treating waste water which facilitates more efficient ozone absorption by the waste water than has been achieved hitherto.

According to the present invention, waste water treatment apparatus comprises a spray nozzle having a nozzle outlet communicating with the interior of a closed ozone absorption chamber, a waste water inlet communicating with the spray nozzle, means for supplying waste water under pressure to the waste water inlet for discharge of the waste water into the interior of the ozone absorption chamber in the form of a spray from the spray nozzle outlet, means for charging the waste water prior to the discharge of the waste water from the spray nozzle outlet, an ozone inlet communicating with the interior of the ozone absorption chamber, means for supplying ozone under pressure to the ozone inlet to permit intimate mixing of the ozone with the charged and sprayed waste water, and a waste water outlet for withdrawal of the waste water from the ozone absorption chamber.

By mixing the ozone with the charged spray of waste water in a closed chamber, intimate mixing of the ozone with the waste water is effected.

To maintain the pressure within the ozone absorption chamber, a syphon arrangement may be provided for withdrawing the waste water from the waste water outlet and for maintaining a head of waste water within the ozone absorption chamber above the waste water outlet.

The charging of the waste water prior to discharge of the waste water into the interior of the ozone absorption chamber may be effected by providing two or more electrodes in a waste water supply duct extending to the waste water inlet, the electrodes being electrically connected, and means being provided for supplying a d.c. current to the electrodes.

Preferably, the spray nozzle is one of a pair of such spray nozzles, each of the nozzles having their outlets directed in opposite, upwardly inclined directions towards the inner surface of the ozone absorption chamber to further promote a mixing of the ozone and the waste water.

The invention will be more readily understood from the following description of a preferred embodiment thereof given, by way of example, with reference to the accompanying diagrammatic drawings, in which:

FIG. 3 shows a view corresponding to FIG. 2, but with one of the spray nozzles of FIG. 2 omitted;

FIG. 4 shows a view taken in longitudinal cross-section through a charging device forming part of the apparatuses of FIGS. 1 to 3;

FIG. 5 is a broken-away cross-sectional view showing in greater detail a portion of the charging device of FIG. 4;

FIG. 6 is a view taken in section along the line VI—VI in a transverse plane through the charging device of FIG. 4; and FIG. 7 shows a view in perspective of a seal.

Figure 1:
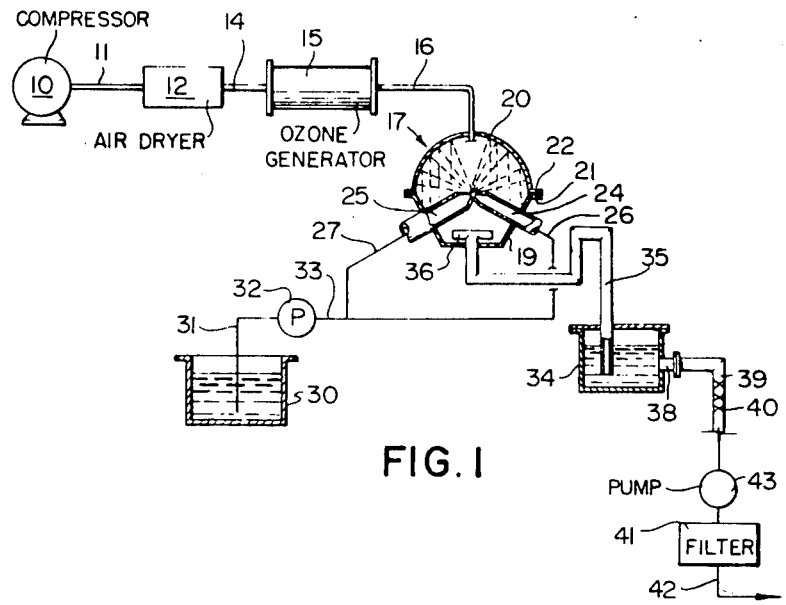
FIG. 1 shows a side view of a waste water treatment apparatus embodying the present invention.

Referring firstly to FIG. 1 of the accompanying drawings, there is illustrated therein a water treatment apparatus for producing charged spray of waste water and mixing the sprayed water with ozone.

The waste water treatment apparatus illustrated in FIG. 1 has an air compressor 10, the outlet of which is connected by a pipe 11 to an air dryer 12.

The outlet of the air dryer 12 is connected by a pipe 14 to an ozone generator 15, the outlet of which, in turn, is connected by a pipe 16 to the interior of an ozone absorption chamber indicated generally by reference numeral 17.

Thus, the discharge end of the pipe 16, communicating with the interior of the ozone absorption chamber 17, provides an ozone inlet for the flow of ozone produced by the ozone generator 15 into the ozone absorption chamber 17.

The ozone absorption chamber 17 is formed by a housing made in two parts. More particularly, the ozone absorption chamber housing comprises a lower, upwardly-open, frusto-conical housing portion 19, and a dome-shaped, downwardly-open and concave upper housing portion 20.

The lower and upper housing portions 19 and 20, which are made of stainless steel, are formed with radially outwardly extending flanges 21 and 22 for receiving bolts 23 (FIG. 2) by means of which the lower and upper housing portions 19 and 20 are secured together with an annular seal 18, made of polytetrafluoroethylene (PTFE), between the flanges 21 and 22.

A pair of waste water spray nozzles, which will be described in greater detail hereinafter, are provided within the ozone absorption chamber 17. These waste water spray nozzles are provided at outlet ends of charging devices indicated by reference numerals 24 and 25. The charging devices 24 and 25 extend through the wall of the lower housing portion 19 and are secured at outlet ends of waste water supply pipes 26 and 27.

As will be described in greater detail hereinafter, the charging devices 24 and 25 are hollow, to enable the flow of waste water therethrough, and the waste water supply pipes 26 and 27, in conjunction with the charging devices 24 and 25, form two waste water supply ducts for the supply of waste water into the interior of the ozone absorption chamber 17.

A reservoir for holding a supply of the waste water, illustrated as a tank 30, is provided with a waste water outlet pipe 31 extending to the inlet of a pump 32, the outlet of which is connected by a pipe 33 to the waste water supply pipes 26 and 27.

Figure 2:
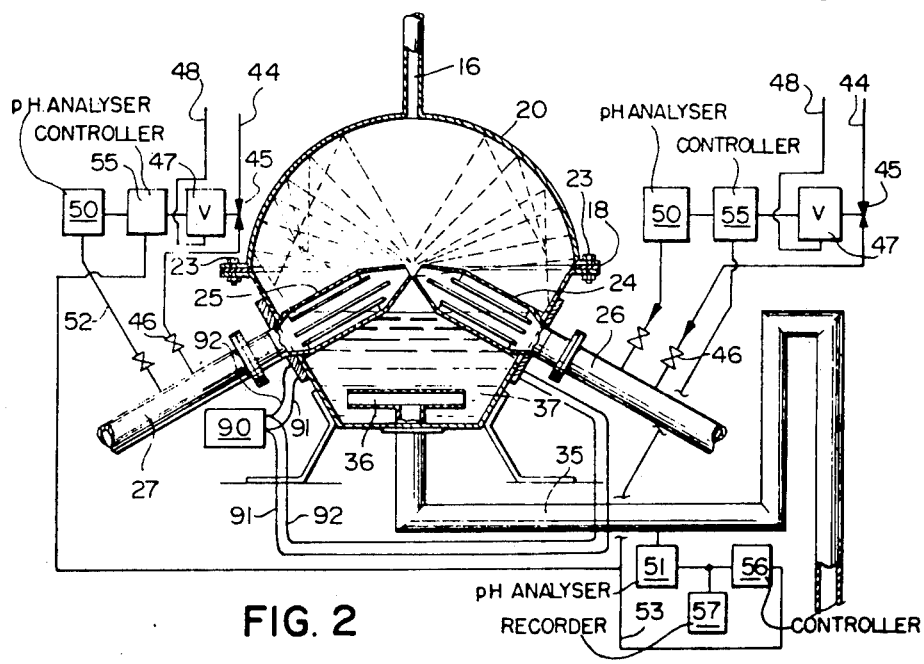
FIG. 2 shows a view, partly in section, illustrating in greater detail the ozone absorption chamber and the electrostatic charging means of the apparatus of FIG. 1.

An outlet for withdrawal of the waste water from the interior of the ozone absorption chamber 17 is provided in the form of a polyvinylchloride pipe 35 which, as can be seen from FIGS. 1 and 2, is in the form of a syphon. The end of the pipe 35 communicating with the interior of the ozone absorption chamber 17 is provided with a Tee-piece 36. The syphon effect of the pipe 35 maintains a head or body of waste water 37 within the ozone absorption chamber 17 above the waste water outlet formed by the Tee-piece 36 and the outlet pipe 35, and the purpose of the Tee-piece 36 is to counteract the formation of vortices in the waste water 37 and thus reduce oscillations in the level of the waste water 37, which would affect the pressure prevailing within the ozone absorption chamber 17.

The outlet end of the pipe 35 discharges into an equalizing tank 34, which is closed to prevent the escape of ozone. The equalizing tank 37 has an outlet 38 communicating with a polyvinylchloride outlet pipe 39, and motionless mixers indicated diagrammatically at 40 are provided for promoting the mixing and absorption of the ozone with the waste water in the outlet pipe 39.

The outlet pipe 39 leads to a microfilter 41, for separating solids and liquids, the microfilter 41 having an outlet pipe 42 for discharging the purified water. A pump 43 is provided upstream of the microfilter 41 for pumping the water through the latter.

The water treatment apparatus is provided with means for introducing a reagent into the waste water prior to the discharge of the waste water to the interior of the ozone absorption chamber 17, and these means will now be described with reference to FIGS. 2 and 3.

As can be seen from FIGS. 2 and 3, the water supply pipes 26 and 27 are each connected with a reagent supply pipe 44, in which on-off valves 45 and 46 are connected.

The on-off valve 46 is a manually operable valve which, in normal operation of the apparatus, is left open, but which can be manually closed when the apparatus is out of operation or when no reagent is required to be supplied to the water supply pipes 26 and 27.

The on-off valve 45 is actuatable by a membrane valve 47, to which an air supply pipe 48 is connected.

To determine the pH value of the waste water in the waste water supply pipes 26 and 27, and in the water discharged through the outlet pipe 51, pH analyzers 50 and 51 are connected by pipes 52 and 53 to the waste water pipes 26 and 27 and to the outlet pipe 35. The pH analyzers 50 and 51 provide output signals, corresponding to the pH values, to controllers 55 and 56, the controller 56 being connected to the controller 55, and the latter being connected to the membrane valve 47 for controlling the operation of the latter.

The pH analyzer 51 is also connected to a strip chart recorder 57.

The pH analyzers 50 and 51 are commercially available analyzers sold by Beckman Instruments Inc., under Model No. 940 and the controllers 55 and 56 are likewise commercially available and sold by the same company under Model No. 5751.

In the modified embodiment of the invention illustrated in FIG. 3, the charging device 24, and the associated reagent supplying apparatus and pH value sensing apparatus, have been omitted.

Otherwise, the construction and operation of the embodiment of FIG. 3 is the same as that of FIGS. 1 and 2, the operation of which is described hereinafter.

FIGS. 4 to 6 illustrate in greater detail the construction of the spray device 25, which is similar to that of the spray device 24.

As shown in FIG. 4, the spray device 25 has a cylindrical body portion 60, made of PTFE welded at one end to a conical end portion 61 also made of PTFE.

A spray nozzle 62 is secured by threaded engagement in the outer end of the conical end portion 61, and is provided with a lock nut 63, which seats against the outer end of the conical end portion 61 for locking the spray nozzle 62 in position.

The opposite end of the cylindrical body portion 60 extends through a circular opening in the wall of the lower housing portion 19, and a stainless steel reinforcement collar 64 is welded to the housing portion 19, and the exterior thereof, around the cylindrical body portion 60.

PTFE collar 65 is secured by threaded engagement to the outwardly projecting end of the cylindrical body portion 60, and a further PTFE collar 66 is secured by welding a PTFE inlet pipe section 67.

O-seals 68 and 69 are provided between the collars 64 and 65 and the collars 65 and 66, respectively, to ensure an air-tight seal around the inlet pipe section 67 and the outwardly-projecting end of the cylindrical body portion 60 with respect to the wall of the lower housing portion 19, the three collars 64, 65 and 66 being clamped together, against the O-seals 68 and 69, by bolts 70 secured by nuts 71, the bolts 70 extending through the wall of the lower housing portion 19 and being secured thereto by welds 72.

Three flat, rectangular, parallel aluminum electrode plates 73, 74 and 75 extend along the interior of the cylindrical body portion 60 and are secured at a spacing from one another by bolts 76 and nuts 77 provided with spacer bushings 78.

As shown in FIG. 4, the inlet pipe section 67 has a frusto-conically outwardly flared end portion 80 extending into the end of the cylindrical body portion 60 and terminating in an annular end ring 81 made of PTFE.

Referring to FIG. 5, it will be seen that the end ring 81 has an inner frusto-conical surface 82 aligned with the inner surface of the flared end portion 80, and a cylindrical outer surface 83. A sealing ring 84 is provided between the cylindrical outer surface 83 of the end ring 81 and the inner surface of the cylindrical body portion 60.

The flared end portion 80 and the end ring 81 are formed with slots (not shown) to accommodate the ends of the electrode plates 73, 74 and 75, PTFE seals 84 being interposed therebetween.

The ends of the electrode plates 73, 74 and 75 are stepped, as indicated by reference numeral 85 in the case of the electrode plate 73, a portion of which is shown in FIG. 5, and the outer end of the end ring 81 abuts against the step 85. In this way, the three electrode plates 73, 74 and 75 are urged into the cylindrical body portion 60 against conical end portion 61.

However, by releasing the bolts 70 and nuts 71, and removing the inlet pipe section 67, the electrode plates 73, 74 and 75, which are secured to the end ring 81 by one of the bolts 76, as can be seen from FIG. 4, may be withdrawn from the cylindrical body portion 60. This enables the electrode plates to be readily replaced when required.

The operation of the above-described apparatus is as follows:

Air from the compressor 10 is passed through the pipe 11 to the air dryer 12, where moisture is removed from this air.

From the air dryer 12, the dried air passes through the pipe 14 to the ozone generator 15.

The ozone generated in the ozone generator 15 passes through the pipe 16 into the interior of the ozone absorption chamber 17.

Waste water drawn from the tank 30 through the pipe 31 by the pump 32 passes through the pipe 33 to the waste water supply pipes 26 and 27, where the reagent is injected into the waste water flow from the reagent supply pipe 44 in accordance with the pH values determined by the pH analyzers 50 and 51. The purpose of the reagent is to facilitate the coagulation and ionization of the waste water and, to this end, the reagent may comprise aluminum sulphate, ferric chloride, or other known coagulants.

The waste water then flows through the charging devices 24 and 25 and, more particularly, past the electrode plates 73, 74 and 75.

A current density up to 3 amperes/sq. decimeter across the plates 73, 74 and 75 is provided by a direct current supplied from a d.c. generator 90, the positive and negative terminals of which, via wires 91 and 92, are electrically connected to the electrode plates 73 and 75, respectively.

The effect of the current flow across the electrode plates is to effect coagulation of colloidal particles in the waste water.

Such colloidal particles have a natural resistance to coagulation, and are characterized by having a large surface to volume ratio, giving them a natural buoyancy, which keeps them in suspension. The particles have negative electrical charges, and thus repel each other, which prevents the particles from colloiding and joining together. The current flow across the electrode plates neutralizes the electro-negative colloidal particles and creates conditions in which the colloidal particles are more easily responsive to subsequent ozone exposure, which breaks down the suspension and provides a very rapid oxidization process. A sufficient current flow across the electrode plates, with respect to the rate of flow of the waste water, can if required be used to sterilize the sediment of the waste water.

Having been thus charged, the waste water is sprayed from the nozzles 67, along non-intersecting paths, against the inner surface of the dome-shaped upper housing portion 20. The waste water is thereby reflected from the inner surface of the upper housing portion 20 in the form of fine droplets, and sufficient ozone is absorbed by the waste water before and after its impact against the upper housing portion to supersaturate the waste water. In this way, under superatmospheric pressure and at a temperature of preferably 12 to 18° C in the interior of the ozone absorption chamber 17, the ozone becomes thoroughly absorbed in the waste water.

The waste water flowing through the outlet pipe 35, under the siphon action of the latter, discharges into the closed equalizing tank 37, and from there is passed through the pipe 39, where further absorption of the ozone is effected by the motionless mixing devices 40.

Finally, the waste water passes to the microfilter 41, where solids and liquid are separated, and the purified water is discharged through the outlet pipe 42.

As will be appreciated by those skilled in the art, the rate of flow of waste water through the above-described apparatus is preferably controlled in accordance with the dimensions of the apparatus and the operating temperature. However, by means of the above-described apparatus, it is possible to effect more efficient ozone absorption, using an ozone absorption chamber of small dimensions, than has been feasible hitherto.

The above-described apparatus and method may be employed for example, for breaking down oil in water, purifying waste water and producing potable water, in the bottling, food and brewing industries, and for tank sterilization in the pharmaceutical industry.

The embodiments of the invention in which an exclusive property or privilege is claimed are defined as follows:

1. Waste water treatment apparatus comprising, in combination: a closed ozone absorption chamber having an electrically grounded conductive inner wall surface at least one spray nozzle having a nozzle outlet communicating with the interior of said closed ozone absorption chamber; a waste water inlet communicating with said spray nozzle; means for supplying waste water under predetermined pressure to said waste water inlet for discharge of said waste water into the interior of said ozone absorption chamber in the form of a non-atomised spray from said spray nozzle outlet to impact on said chamber inner surface; means for electrically charging said waste water prior to the discharge of said waste water from said spray nozzle outlet to provide transfer of an electrical charge from the waste water to the chamber wall at said impact, an ozone inlet communicating with the interior of said ozone absorption chamber; means for supplying ozone under pressure to said ozone inlet for intimate mixing of said ozone with the sprayed waste water; and a waste water outlet for withdrawal of ozonated waste water from said ozone absorption chamber.

2. Waste water treatment apparatus as claimed in claim 1, wherein said means for supplying waste water comprise a waste water duct communicating with said waste water inlet, and closing means are provided for introducing a reagent into said waste water duct.

3. Waste water treatment apparatus as claimed in claim 2, further comprising pH analyzer means for analyzing the pH value of the waste water prior to the introduction of the reagent, and controller means, responsive to said pH analyzer means, for regulating the rate of introduction of the reagent by said closing means.

4. Waste water treatment apparatus as claimed in claim 1 further comprising pH analyzer means for analyzing the pH value of the waste water beyond said waste water outlet and controller means responsive to said pH analyzer means for regulating a reagent dosage means.

5. Waste water treatment apparatus as claimed in claim 1 further comprising first pH analyzer means for analyzing the pH value of the waste water prior to the introduction of a reagent, second pH analyzer means for analyzing the pH value of the waste water beyond said waste water outlet, and first and second controller means for regulating said dosage means respectively.

6. Waste water treatment apparatus as claimed in claim 1 wherein said means for supplying waste water comprise a waste water duct communicating with said spray nozzle, and said means for charging said waste water comprise at least two electrodes which are disposed within said duct, means supporting said electrodes at a spacing from one another for flow of the waste water between said electrodes, and means for maintaining an electrical current flow acrosss said electrodes.

7. Waste water treatment apparatus as claimed in claim 1, further comprising syphon means communicating with said waste water outlet for withdrawing said waste water from said ozone absorption chamber, said waste water outlet being at the bottom of said ozone absorption chamber and said syphon means being arranged to maintain a head of waste water within said ozone absorption chamber over said waste water outlet.

8. Waste water treatment apparatus as claimed in claim 1 wherein said spray nozzle is directed to discharge said waste water spray against the inner surface of said ozone absorption chamber.

9. Waste water treatment apparatus as claimed in claim 1 having first and second spray nozzles; said waste water supplying means comprising first and second water inlet ducts, said electrical charging means comprising first and second charging means connected respectively to said first and second inlet ducts.

10. Waste water treatment apparatus as claimed in claim 9 wherein said first and second spray nozzles are directed in opposite, upwardly inclined, mutually offset directions towards the inner surface of said ozone absorption chamber.

11. Waste water treatment apparatus as claimed in claim 9 further comprising means for receiving the waste water from said waste water inlet and separating solids from said waste water.

12. Waste water treatment apparatus as claimed in claim 11 further comprising mixing means between said separator means and said waste water outlet for further mixing said ozone and said waste water.

* * * * *